(12) United States Patent
Takaragi

(10) Patent No.: US 6,859,794 B2
(45) Date of Patent: Feb. 22, 2005

(54) IMAGE PROCESSING SYSTEM, IMAGE PROCESSING APPARATUS, IMAGE PROCESSING METHOD, AND STORAGE MEDIUM

(75) Inventor: Yoichi Takaragi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 375 days.

(21) Appl. No.: 09/796,473

(22) Filed: Mar. 2, 2001

(65) Prior Publication Data
US 2001/0025348 A1 Sep. 27, 2001

(30) Foreign Application Priority Data
Mar. 21, 2000 (JP) ........................................ 2000/078447

(51) Int. Cl.$^7$ .............................................. G06F 17/00
(52) U.S. Cl. ........................................ 705/67; 713/202
(58) Field of Search ................................. 396/429, 312; 355/31, 40; 713/200–202; 705/50, 51, 57, 58, 67, 64; 380/200–204

(56) References Cited

U.S. PATENT DOCUMENTS 5,644,727 A * 7/1997 Atkins ........................ 395/240
5,907,824 A 5/1999 Tzirkel-Hancock ......... 704/242
6,163,656 A * 12/2000 Yoshioka ..................... 396/429

FOREIGN PATENT DOCUMENTS

JP 410078995 A * 3/1998

* cited by examiner

Primary Examiner—Pierre Elisca
(74) Attorney, Agent, or Firm—Fitzpatrick, Cella, Harper & Scinto

(57) ABSTRACT

In the present invention, an electronic apparatus adds user information to print information and transfers the print information, to which the user information has been added, to an image processing apparatus. The image processing apparatus specifies a voice feature based on the user information received from the electronic apparatus, specifies user-authentication information by executing voice authentication processing based on the specified voice feature, and starts output of the print information based on the specified user-authentication information. Hence, it is possible to output print information after assuredly authenticating a regular user, and start output of the print information according to an instruction only from the regular user.

13 Claims, 9 Drawing Sheets

IMAGE PROCESSING SYSTEM, IMAGE PROCESSING APPARATUS, IMAGE PROCESSING METHOD, AND STORAGE MEDIUM

BACKGROUND OF THE INVENTION

1. Field of the Invention

The present invention relates to an image processing system, an image processing apparatus, an image processing method, and a storage medium. Particularly, the invention relates to a technique which allows printing after assuredly determining whether or not a user himself requests printing when performing printing using a printer connected to a computer.

2. Description of the Related Art

A technique has been known in which print data is transferred from a computer to a printer, and the printer starts output of printing information according to an instruction only from a regular user.

Information processing apparatuses have also been known in which it is determined whether or not the right to use an apparatus is to be given to a user requesting start of output of printing information, by identifying the user utilizing organism information, such as fingerprint information or the like.

The conventional method of transferring print data from a computer to a printer, inputting a password at the printer, and starting output of printing information according to an instruction only from a regular user has the problem that if the password is leaked to a third party, it becomes impossible to allow output of the printing information only to a regular user because even an irregular user can start output of the printing information.

The approach of intending to more assuredly identify a user by utilizing organism information, such as voice information or the like, has the problem that, since personal confidential information is transmitted through a communication network, the personal confidential information may be leaked if data on the communication network is intercepted.

SUMMARY OF THE INVENTION

The present invention has been made in consideration of the above-described problems.

It is an object of the present invention to provide an image processing apparatus in which output of printing information is more flexibly and assuredly started according to an instruction only from a regular user.

It is another object of the present invention to provide an image processing apparatus in which output of printing information is assuredly started according to an instruction only from a regular user, while keeping personal confidential information.

According to one aspect, the present invention which achieves these objectives relates to an image processing system for forming an image based on print information transferred from an electronic apparatus to an image processing apparatus. The electronic apparatus includes information addition means for adding user information to the print information, and transfer means for transferring the print information having the user information added thereto to the image processing apparatus. The image processing apparatus includes voice-feature specification means for specifying a voice feature based on the user information received from the electronic apparatus, user-authentication-information specification means for specifying user-authentication information by executing voice authentication processing based on the voice feature specified by the voice-feature specification means, and print-information output means for starting output of the print information based on the user-authentication information specified by the user-authentication-information specification means.

In one embodiment, the user-authentication-information specification means selects corresponding user-authentication information from among a plurality of sets of user-authentication information held in a memory within the image processing apparatus.

In another embodiment, the user-authentication-information specification means specifies the user-authentication information using user-authentication information of an external medium connected to the image processing apparatus.

According to another aspect, the present invention which achieves these objectives relates to an image processing apparatus for outputting print information by receiving user information and the print information transferred from an electronic apparatus. The image processing apparatus includes voice-feature specification means for specifying a voice feature based on the user information received from the electronic apparatus, user-authentication-information specification means for specifying user-authentication information by executing voice authentication processing based on the voice feature specified by the voice-feature specification means, and print-information output means for starting output of the print information based on the user-authentication information specified by the user-authentication-information specification means.

In one embodiment, the user-authentication-information specification means selects corresponding user-authentication information from among a plurality of sets of user-authentication information held in an internal memory.

In another embodiment, the user-authentication-information specification means uses user-authentication information of an externally connected medium.

In still another embodiment, the use-authentication information is encrypted, and the image processing apparatus further includes user-information determination means for determining the user information by decoding the encrypted user-authentication information.

In yet another embodiment, the user-authentication-information specification means specifies the user-authentication information using a voice recognition method.

According to still another aspect, the present invention which achieves these objectives relates to an image processing method in a system for forming an image on a medium based on print information transferred from an electronic apparatus to an image processing apparatus. The method includes steps performed by the electronic apparatus including an information addition step of adding user information to the print information, and a transfer step of transferring the print information having the user information added thereto to the image processing apparatus. The method also includes steps performed by the image processing apparatus including a voice-feature specification step of specifying voice features based on the user information received from the electronic apparatus, a user-authentication-information specification step of specifying user-authentication information by executing voice authentication processing based on the voice feature specified in the voice-feature specification step, and an information output step of starting output of the print information based on the user-authentication information specified in the user-authentication-information specification step.

In one embodiment, the user-authentication-information specification step is performed by selecting specific user-authentication information from among a plurality of sets of user-authentication information held in a memory within the image processing apparatus.

In another embodiment, the user-authentication-information specification step is performed using user-authentication information of an external medium connected to the image processing apparatus.

According to yet another aspect, the present invention which achieves these objectives relates to a storage medium storing a program constituting one of the above-described means, so as to be readable from a computer.

According to yet a further aspect, the present invention which achieves these objectives relates to a storage medium storing a program for executing one of the above-described steps, so as to be readable from a computer.

According to still another aspect, the present invention which achieves these objectives relates to a program for executing one of the above-described means steps.

The foregoing and other objects, advantages and features of the present invention will become more apparent from the following detailed description of the preferred embodiments taken in conjunction with the accompanying drawings.

DETAILED DESCRIPTION OF THE PREFERRED EMBODIMENTS

Image processing systems, image processing apparatuses, image processing methods, and storage media according to preferred embodiments of the present invention will now be described in detail with reference to the drawings.

First Embodiment

Figure 1:
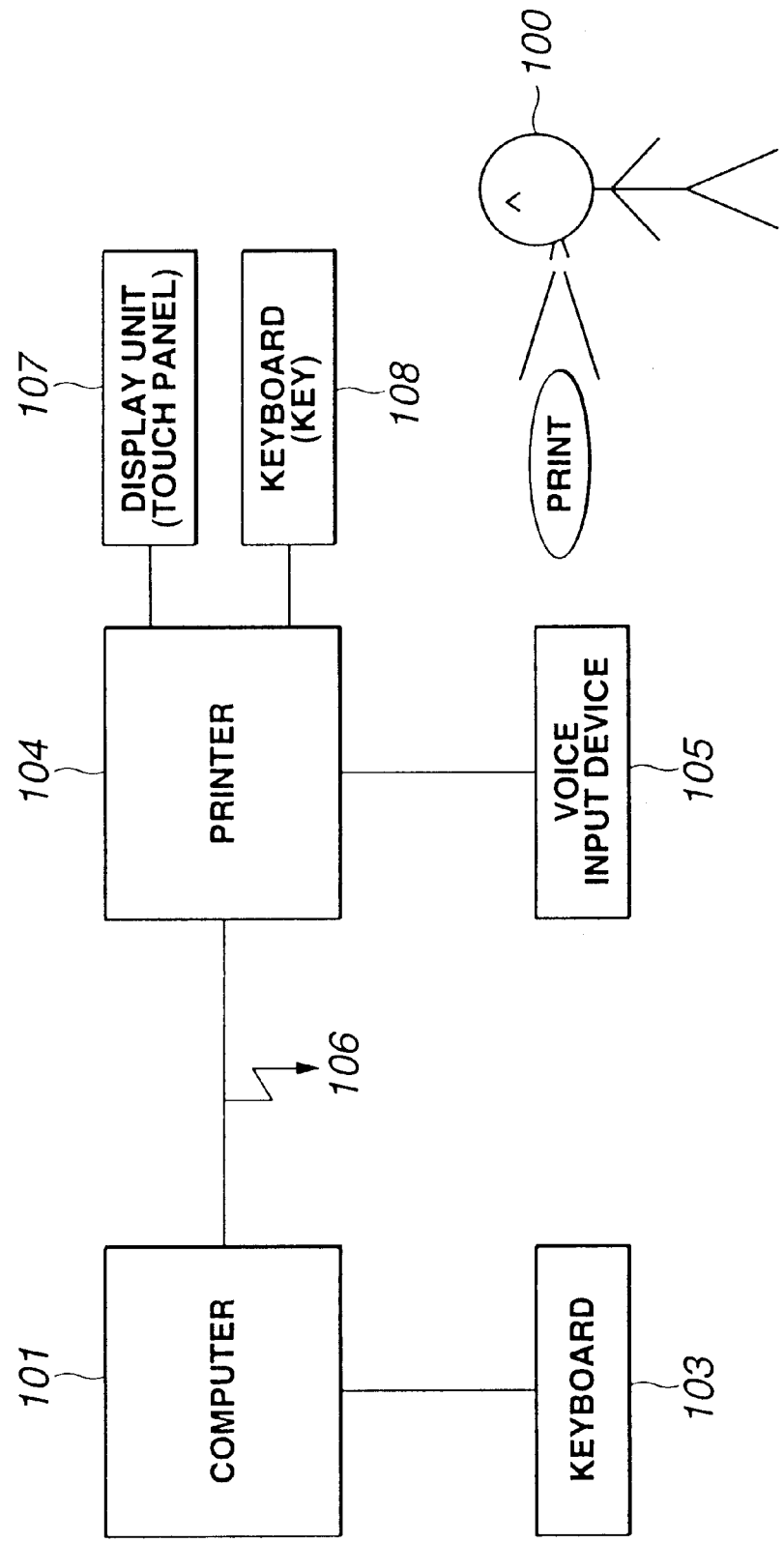
FIG. 1 is a block diagram illustrating the configuration of a print system including a computer and a printer, according to a first embodiment of the present invention.

FIG. 1 is a block diagram illustrating the configuration of a print system including a computer and a printer, according to a first embodiment of the present invention.

In FIG. 1, a voice input device 105 includes a microphone (not shown) and an A/D (analog-to-digital) converter, and reads voice data of a user 100 as digital voice data. Print data, and user-identification information for identifying the user 100 are transmitted from a computer 101 to a printer 104 via a data transmission channel 106.

After storing the user-identification information transmitted from the computer 101, and authenticating the user 100 based on the user-identification information, the printer 104 prints the print data on a medium. In FIG. 1, there are also shown a keyboard 103, a display unit (a touch panel) 107, and a keyboard (having operation keys) 108 at the printer 104.

Figure 2:
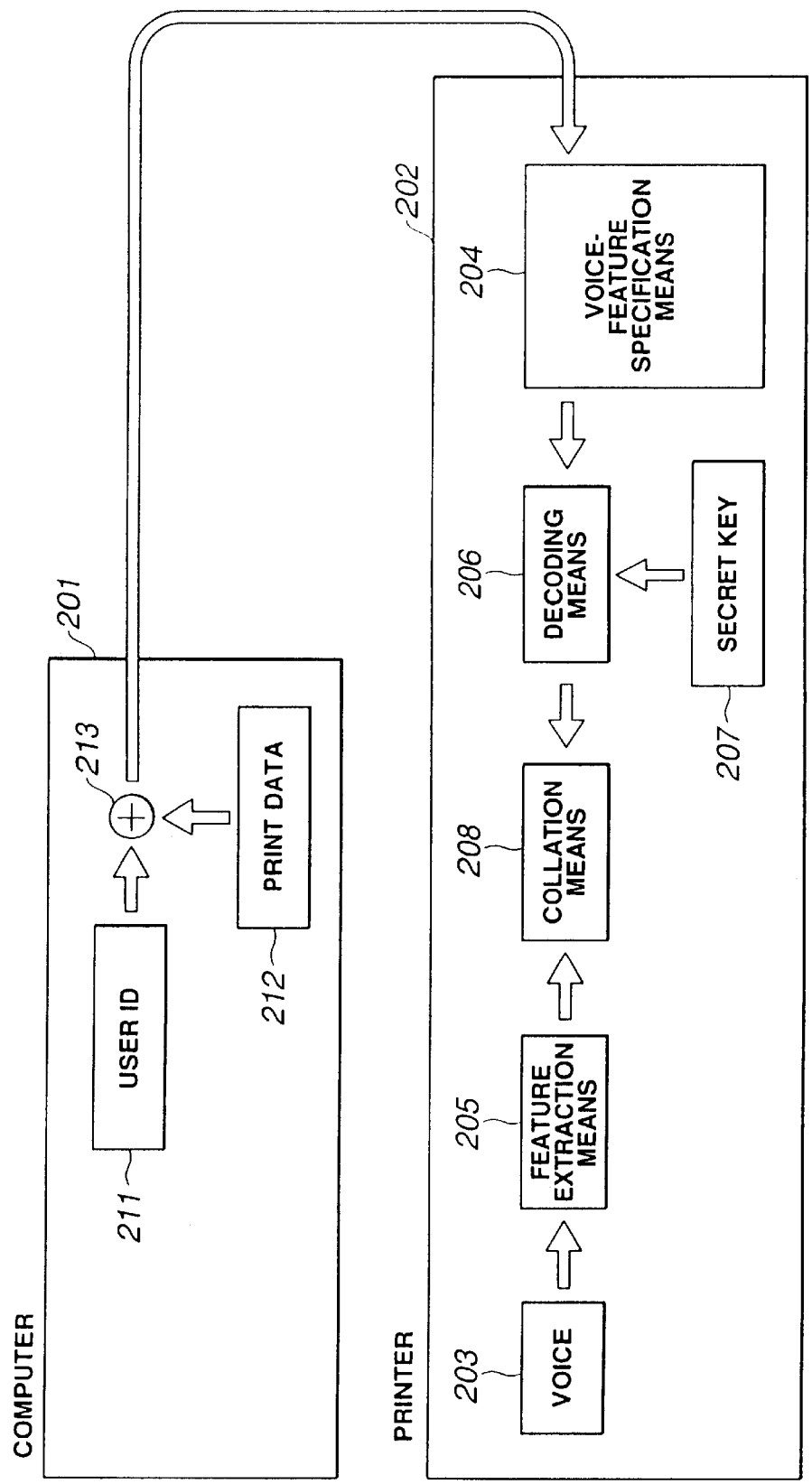
FIG. 2 is a diagram illustrating the configurations of functions for executing respective processes in the first embodiment.

FIG. 2 is a block diagram illustrating the contents of processing of the print system of the first embodiment in detail.

In FIG. 2, reference numeral 201 represents a block illustrating functional means whose program is formed by the computer 101. The block 201 includes addition means 213 for adding a user ID 211, such as the number of each corporate staff, or the like, to print data 212, and transmitting the resultant data to the printer 104.

Figure 13:
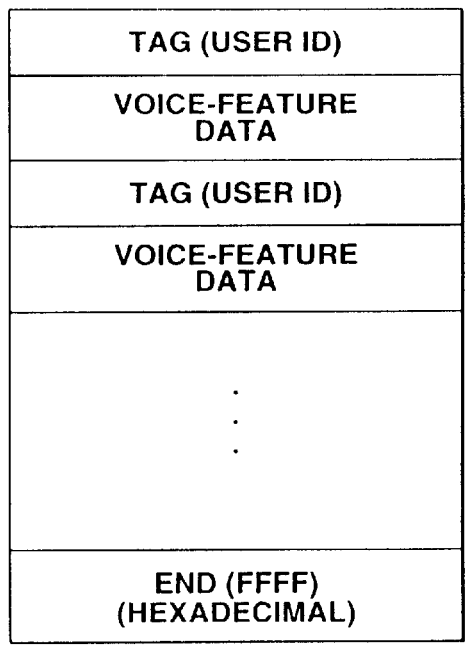
FIG. 13 is a diagram illustrating voice features stored within the printer.

Reference numeral 202 represents a block illustrating respective functional means whose programs are formed by a CPU and a storage medium (both not illustrated) incorporated within the printer 104. The block 202 includes feature extraction means 205 for extracting a feature of voice data 203 read by the voice input device 105, and voice-feature specification means 204 for specifying a voice feature (see FIG. 13) stored within the printer 104 which corresponds to the user ID 211 transmitted from the functional block 201 at the computer 101.

The data of the voice feature specified by the voice-feature specification means 204 is transmitted to decoding means 206, which decodes the data using a secret key 207. The decoded voice-feature data is transmitted to collation means 208. The collation means 208 is provided with the voice-feature data read by the voice input device 105, and collates the two types of voice-feature data.

Figure 3:
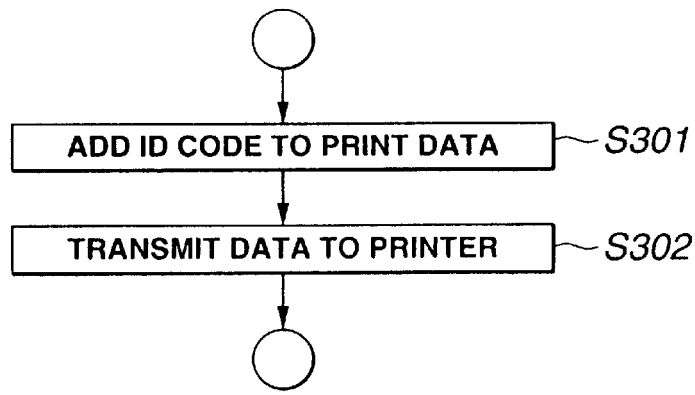
FIGS. 3 and 4 are flowcharts, each illustrating an operation of a CPU (central processing unit) incorporated in the computer.

FIG. 3 is a flowchart illustrating the contents of processing executed when a CPU (not shown) incorporated within the computer 101 adds the user ID 211 to the print data 212 according to a program stored within a memory.

As shown in FIG. 3, first, in step S301, the user ID 211 stored in the computer 101 is added to the print data 212.

Then, in step S302, the print data 212 is transmitted from the computer 101 to the printer 104 via the data transmission channel 106.

Figure 4:
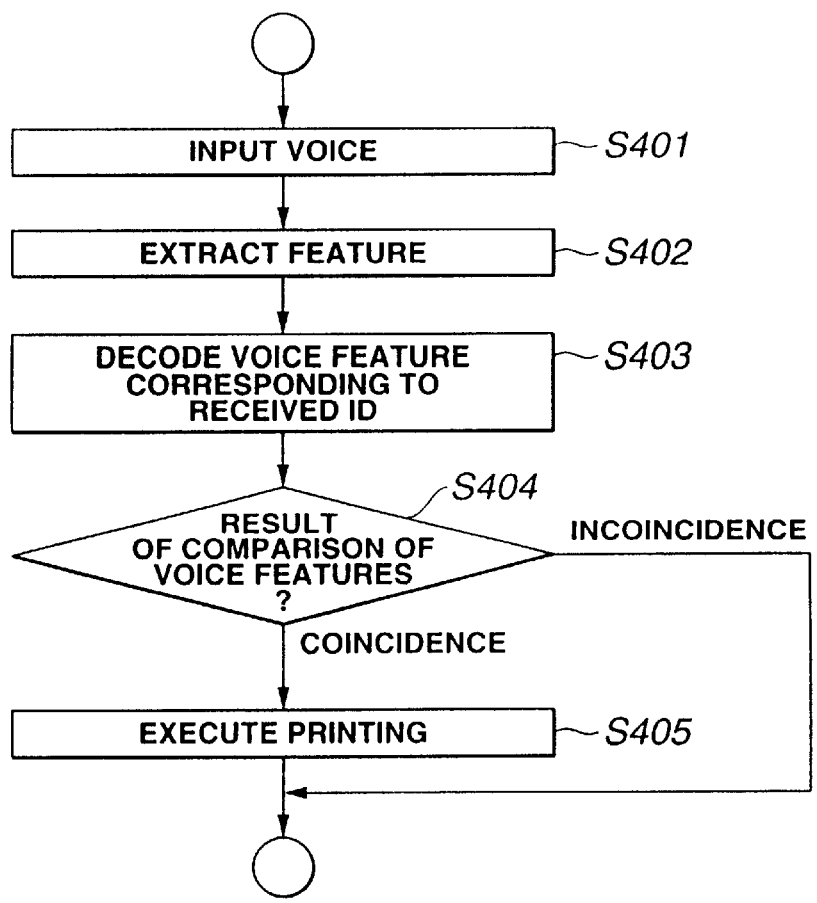

FIG. 4 is a flowchart illustrating the contents of processing of a program to be executed by the CPU incorporated within the printer 104, when identifying a voice feature.

First, in step S401, digital voice data is input via the voice input device 105.

Then, in step S402, a voice feature is extracted by performing data conversion of the input digital voice data according to a method to be described in detail with reference to FIG. 5.

Then, in step S403, a voice feature corresponding to the user ID 211 transmitted from the functional block 201 of the computer is specified. As described above, the voice feature is stored in the printer 104 with a format shown in FIG. 13.

Figure 8:
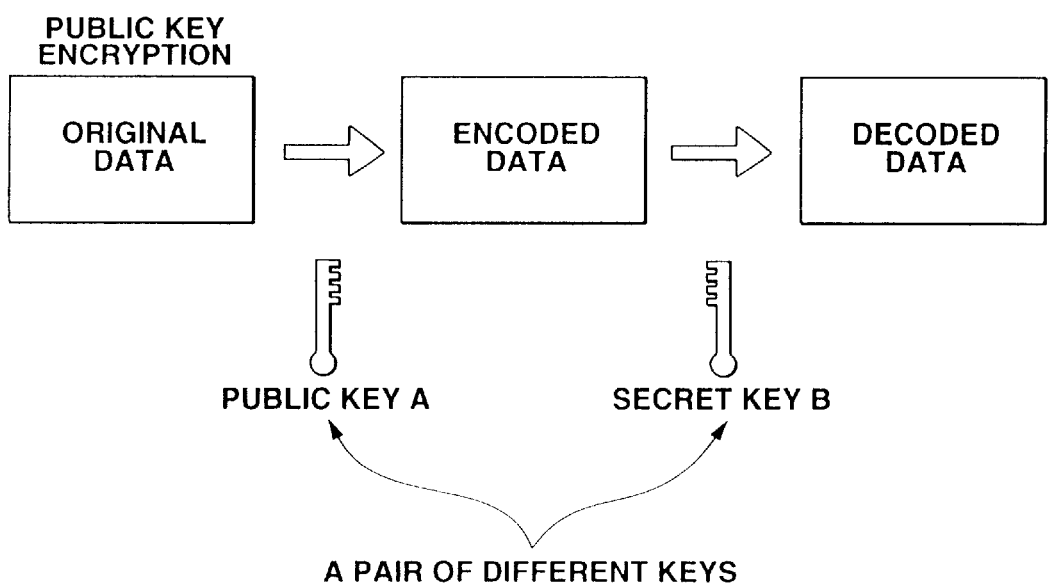
FIG. 8 is a diagram illustrating public-key encryption (encryption not to be processed)

The voice feature stored in the printer 104 has been encrypted by a public key A shown in FIG. 8, and is decoded using a secret key B at this time.

Then, in step S404, it is determined whether or not the voice feature obtained in step S402 coincides with the voice feature specified in step S403 by comparing and collating these two types of voice features.

If these two types of voice features coincide as the result of the determination in step S403, it indicates that the concerned user is the regular user 100. Hence, the process proceeds to step S405, where a printing processing is executed.

Figure 5:
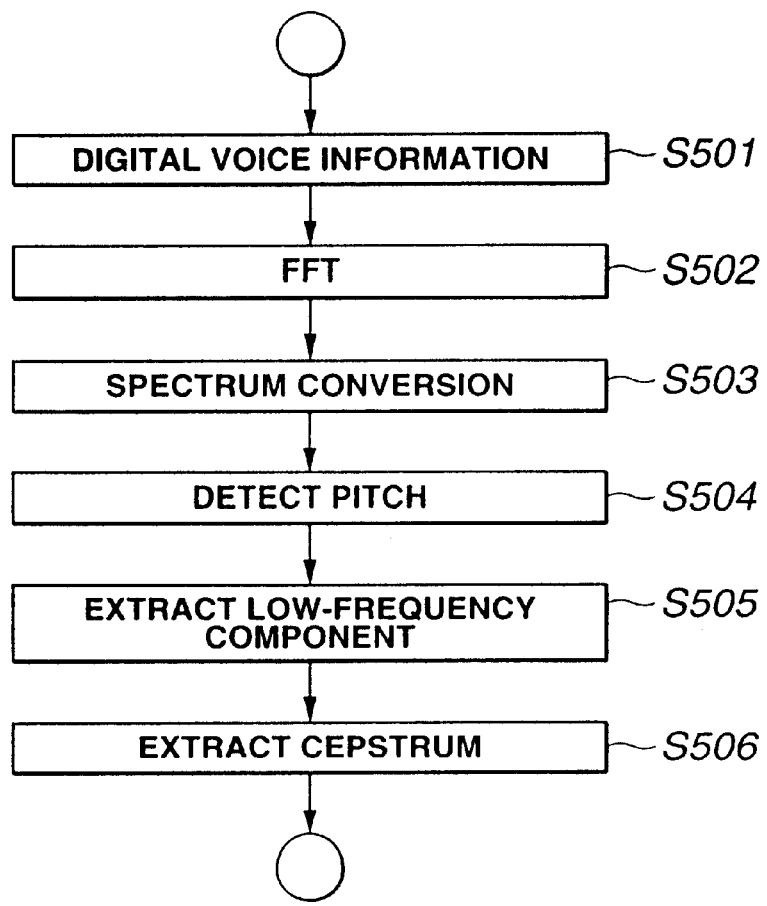
FIG. 5 is a flowchart illustrating a voice-feature extraction method.

FIG. 5 is a flowchart illustrating the method of extracting a voice feature performed in step S402 shown in FIG. 4. This flowchart is executed by a program stored in a memory of the CPU.

When digital voice information has been input via the voice input device 105 in step S501, the process proceeds to step S502, where the input digital voice information is subjected to FFT (fast Fourier transform) with a certain number of sampling points.

Then, in step S503, frequency components of the voice signal subjected to FFF are analyzed. Then, in step S504, pitch detection is performed. In this step, a pitch, serving as the basic frequency of a human vocal cord, contained in the voice information subjected to frequency analysis in step S503 that is called a spectrum, is detected.

Then, in step S505, a low-frequency component including information relating to the shape of a vocal channel, serving as one of sets of human personal information, is extracted from the pitch information detected in step S504.

The process then proceeds to step S506, where the information relating to the shape of the vocal channel obtained in step S505 is converted into a feature parameter called a cepstrum which well represents personal information. Since the cepstrum, serving as a voice feature, and a matching technique utilizing a feature are known, and are described in detail, for example, in Japanese Patent Application Laid-Open (Kokai) No. 09-230888 (1997), a detailed description thereof will be omitted.

Figure 6:
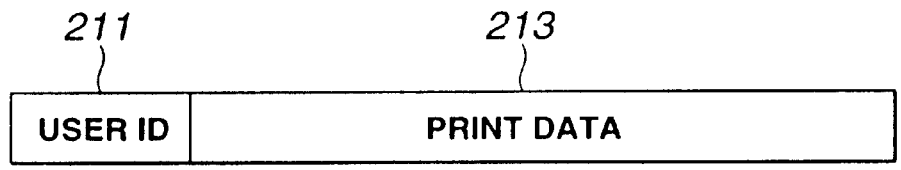
FIG. 6 is a diagram illustrating a format of data transmitted from the computer to the printer.

FIG. 6 illustrates the format of data transmitted from the computer 101 to the printer 104. According to the above-described first embodiment, in a secure print system in which the printer 104 executes authentication of a voice feature during printing, by transmitting the user ID 211 for specifying the user 100 from the computer 101 to the printer 104, and performing voice authentication processing by specifying a corresponding voice feature at the printer 104, it is possible to perform voice authentication processing at the printer 104 without transmitting data of the voice feature through the data transmission channel 106 between the computer 101 and the printer 104.

Second Embodiment

Next, a second embodiment of the present invention will be described. The above-described image processing system of the first embodiment receives image data transferred from an electronic apparatus to an image forming apparatus, and includes means for transferring user information added by the electronic apparatus to the image forming apparatus, and means for specifying a voice feature based on the user information received by the image forming apparatus. Voice authentication processing is executed based on the specified voice features, and output of printing information is started.

On the other hand, an image processing system according to the second embodiment receives image data transferred from an electronic apparatus to an image forming apparatus, and includes means for transferring user information added by the electronic apparatus to the image forming apparatus, and means for executing voice authentication processing and starting output of printing information based on the user information received by the image forming apparatus and a voice feature stored in a card connected to the image forming apparatus.

Figure 7:
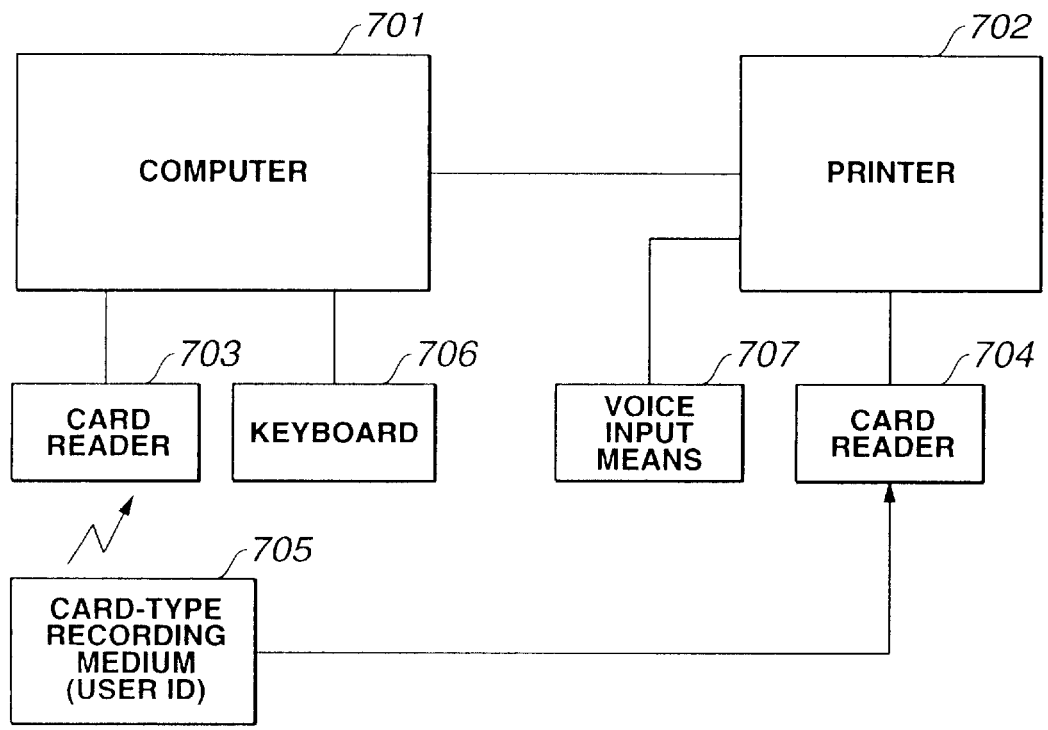
FIG. 7 is a block diagram illustrating the configuration of a print system including a computer and a printer, according to a second embodiment of the present invention.

FIG. 7 is a diagram illustrating a principal portion of the second embodiment. In the second embodiment, a user ID and a voice feature are stored in advance in a card, and processing of authenticating a user is performed using data read by a card reader 704 connected to a computer 701 and a printer 702. A keyboard 706 is connected to the computer 701. Reference numeral 707 represents voice input means.

The operation of the system will be described in more detail. In the computer 701, a user ID 911 (see FIG. 9) stored in a card-type recording medium 705 is read by the card reader 704, and is added to print data 912. The resultant data is transmitted to the printer 702.

In the printer 702, voice authentication processing is performed by specifying a voice feature corresponding to the received user ID 911 from voice-feature data read from the card reader 704 connected to the printer 702.

Figure 9:
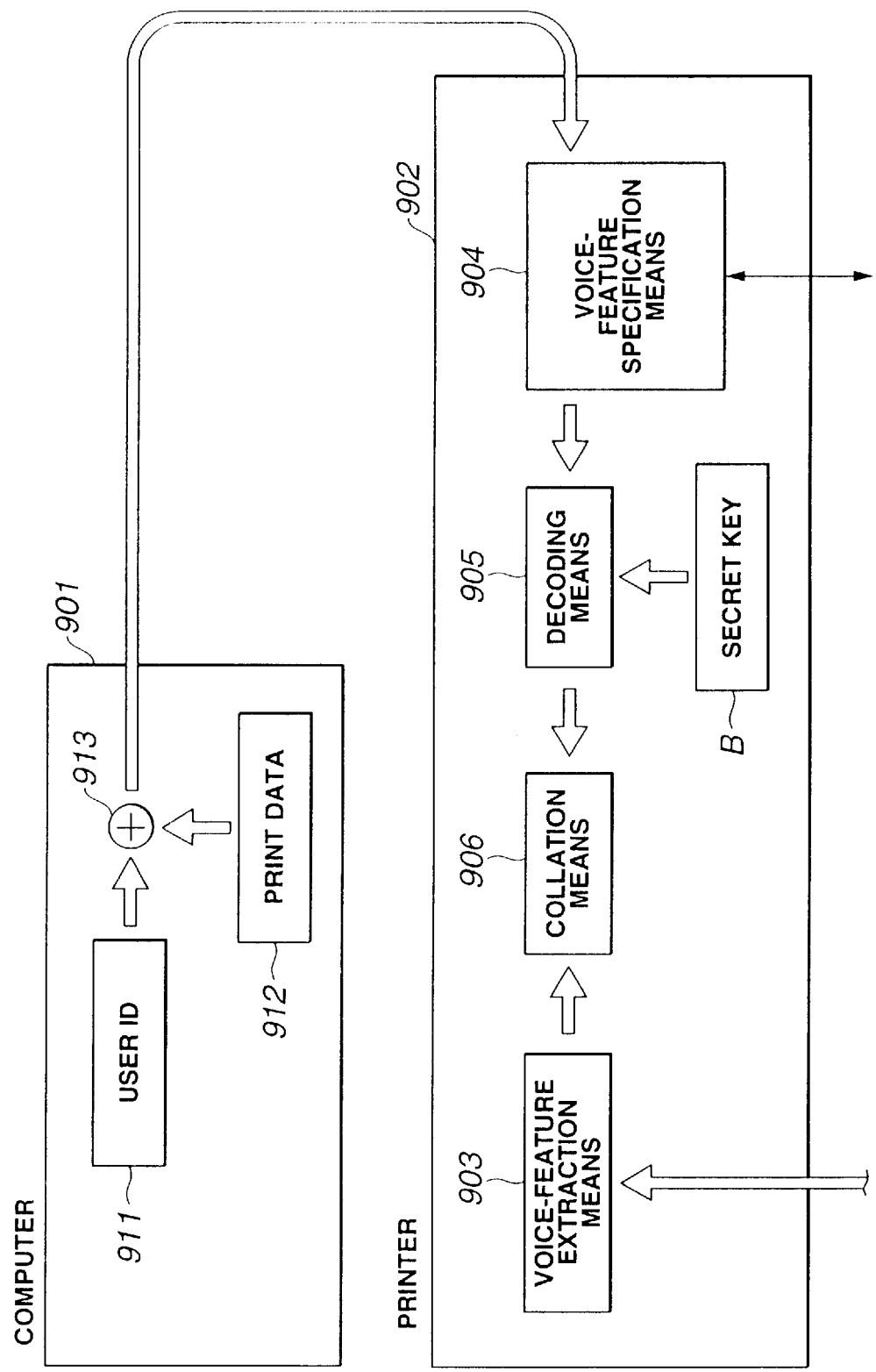
FIG. 9 is a diagram illustrating the configurations of functions for executing respective processes in the second embodiment.

FIG. 9 is a diagram illustrating the contents of processing based on a program for adding and identifying a voice feature, according to the second embodiment. In FIG. 9, reference numeral 901 represents a functional block configured by a program of the computer 701. Reference numeral 902 represents a block illustrating respective functions whose programs are formed by a computer including mainly a CPU incorporated in the printer 702.

As shown in FIG. 9, the functional block 901 includes addition/transmission means 913 for adding the user ID 911, such as the number of each corporate staff, or the like, to the print data 912, and transmitting the resultant data to the printer 702.

The functional block 902 includes voice-feature extraction means 903, voice-feature specification means 904, decoding mean 905, collation means 906 and the like, so as to extract a feature of voice data read from the card-type recording medium 705 by the card reader 704.

The voice-feature specification means 904 specifies a voice feature corresponding to the user ID 911 transmitted from the computer 701 from among features of voice data read from the card-type recording medium 705. In the second embodiment, the feature of the voice data is encrypted by the public key A shown in FIG. 8, and the decoding means 905 decodes the encrypted feature using the secret key B.

The voice feature corresponding to the decoded user ID is provided to the collation means 906, which compares and collates the provided feature with the feature of the voice data that has been read by the voice input device 707. When these two features coincide, the print data is printed.

Figure 10:
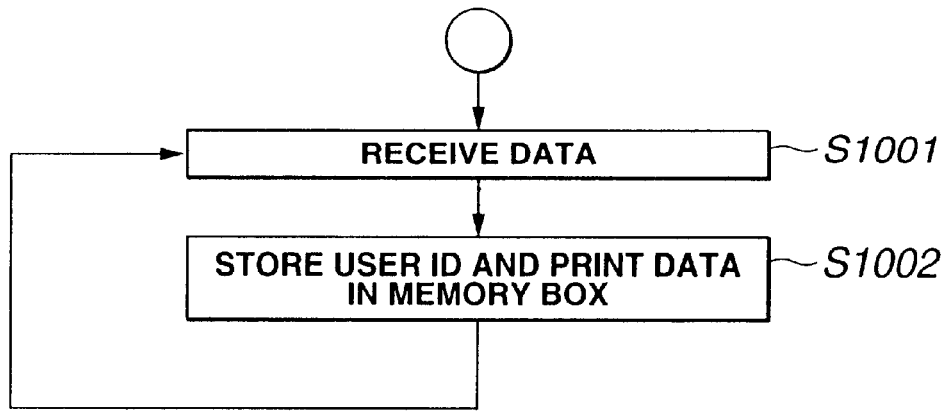
FIG. 10 is a flowchart illustrating a processing procedure performed when a CPU incorporated in the printer of the second embodiment has received print data.

FIG. 10 is a flowchart illustrating processing based on a program stored in a memory of a CPU incorporated within the printer 702, when the printer 702 has received print data.

When print data has been received in the first step S1001, the process proceeds to step S1002, where the following processing is performed.

Figure 14:
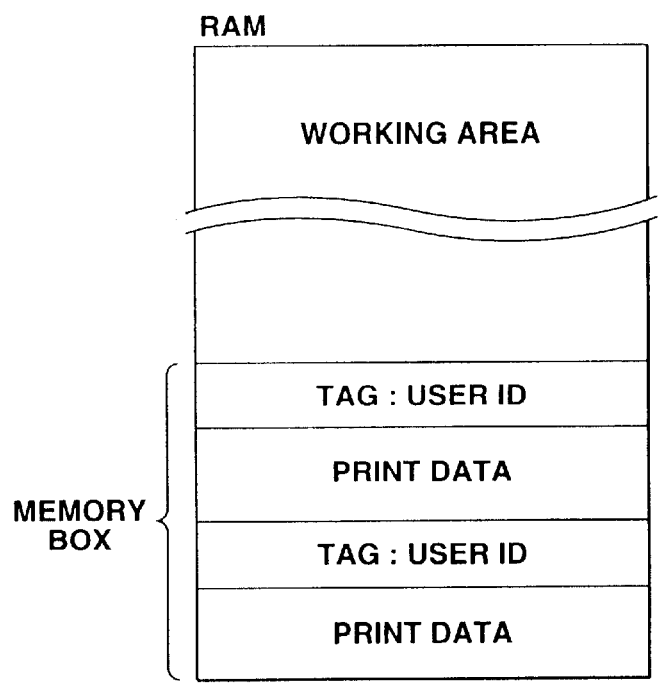
FIG. 14 is a diagram illustrating a memory box region in a memory.

In step S1002, the print data is stored in a memory box region in a memory (RAM (random access memory)) 1203 shown in FIG. 14 in accordance with received user ID. The memory box region is provided in the RAM 1203 in order to store user IDs and print data.

Figure 11:
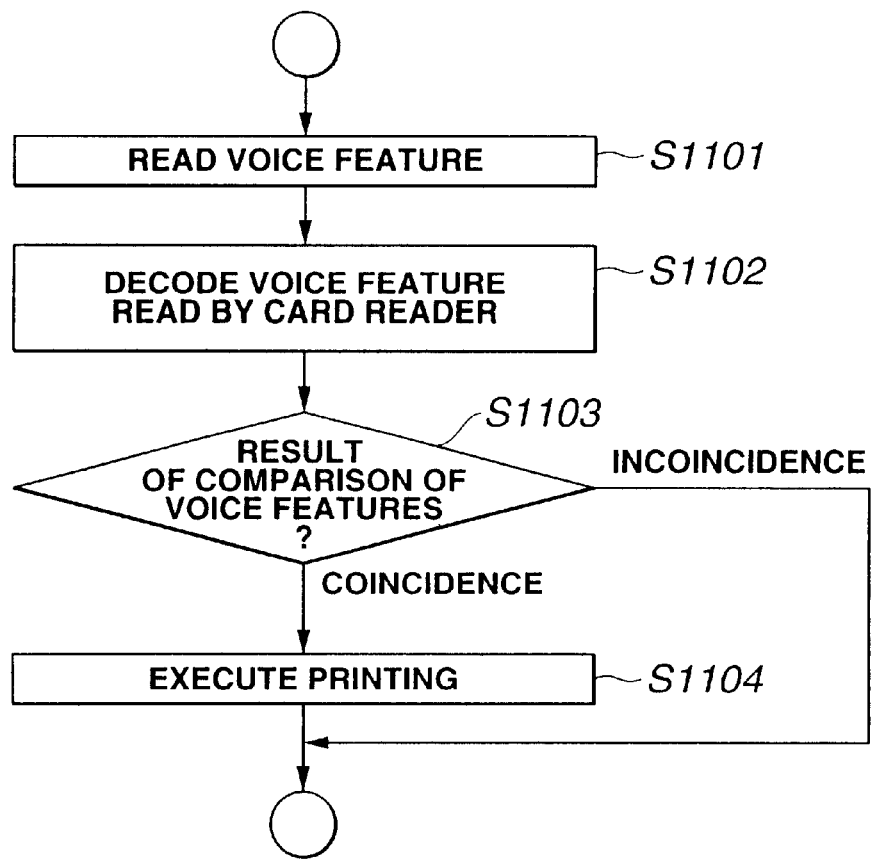
FIG. 11 is a flowchart illustrating the operation of the CPU incorporated in the printer.

FIG. 11 is a flowchart illustrating the operation performed by the CPU incorporated within the printer 702 during printing based on a program. As shown in FIG. 11, first, in step S1101, a feature of voice data read by the voice input device 707 is extracted.

Then, in step S1102, the voice feature stored in the card-type recording medium 705 is read by the card reader 704, and the read voice feature is decoded using the secret key B shown in FIG. 8.

Then, in step S1103, the voice feature extracted in step S1101 is compared and collated with the voice feature read by the card reader 704 in step S1102. When these two voice features coincide, the process proceeds to step S1104, where printing is executed.

In step S1104, only print data which coincides with the user ID read by the card reader 704 from among data in the memory box shown in FIG. 14 is printed. It is thereby possible to assuredly prevent the problem that data other than print data confirmed to be of the user is unexpectedly printed.

Figure 12:
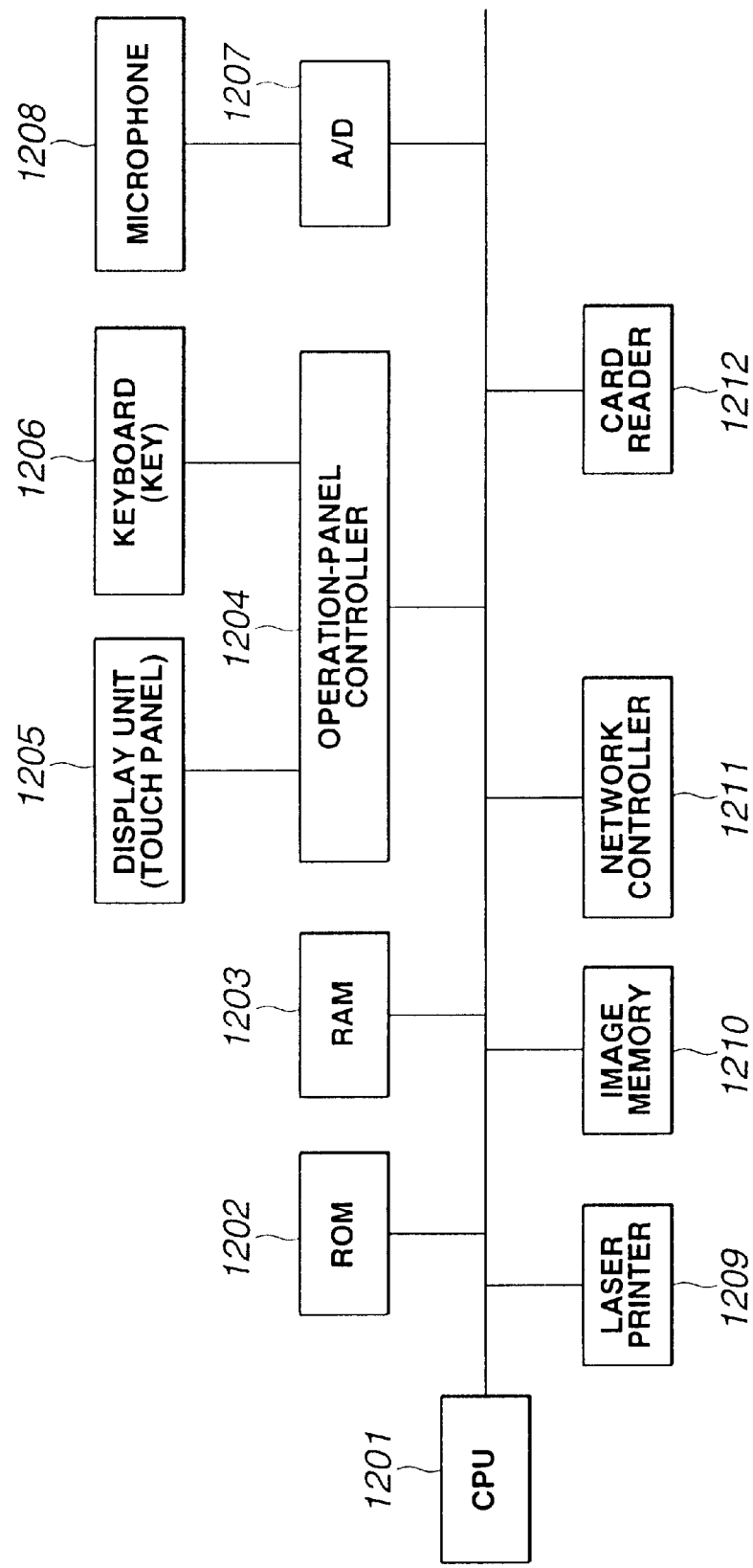
FIG. 12 is a block diagram illustrating the configuration of hardware of the printer of the second embodiment.

FIG. 12 is a block diagram illustrating the configuration of hardware of the printer 702 of the second embodiment. As shown in FIG. 12, the printer 702 includes a CPU 1201, a ROM (read-only memory) 1202, a RAM 1203, an operation-panel controller 1204, a display unit (a touch panel) 1205, a keyboard 1206, an A/D converter 1207, a microphone 1208, a laser printer 1209, an image memory 1210, a network controller 1211, a card reader 1212, and the like.

FIG. 8 is a diagram illustrating public-key encryption (encryption not to be processed). In public-key cryptography, encryption and decoding are performed by a pair of the public key A and the secret key B, respectively. By using public-key cryptography (encryption not to be processed), only a person who knows the secret key B can decode an encrypted voice feature. Hence, it is possible to improve the function of privacy protection.

In the second embodiment, user's peculiar information (a voice feature) is written in the card-type recording medium 705, and is read by the card reader 704, and therefore it is unnecessary to hold a voice feature within the printer 702. Hence, it is possible to more assuredly protect privacy of personal information.

Other Embodiments

The present invention may be applied to a system comprising a plurality of apparatuses (such as a host computer, an interface apparatus, a reader, a printer and the like), or to an apparatus comprising a single unit.

The present invention may also be applied to an approach in which, in order to operate various devices so as to realize the functions of the above-described embodiments, program codes of software for realizing the functions of the above-described embodiments are supplied to an apparatus connected to the various devices or a computer within a system, and the various devices are operated according to a program stored in a computer (a CPU or an MPU (microprocessor unit)) of the system or the apparatus.

In such a case, the program codes of the software themselves realize the functions of the above-described embodiments, so that means for supplying the computer with the program codes, such as a storage medium storing such program codes, constitutes the present invention. For example, a floppy disk, a hard disk, an optical disk, a mangetooptical disk, a CD(compact disc)-ROM, a magnetic tape, a nonvolatile memory card, a ROM or the like may be used as the storage medium for supplying the program codes.

Such program codes, of course, consititute the embodiments of the present invention not only when the functions of the above-described embodiments are realized by executing the supplied program codes by a computer, but also when the functions of the above-described embodiments are realized by the program codes in cooperation with an OS (operating system) operating in a computer, other application software, or the like.

The present invention may, of course, be applied to a case in which after the supplied program codes have been stored in a memory provided in a function expanding board of a computer or in a function expanding unit connected to the computer, a CPU or the like provided in the function expanding board or the function expanding unit performs a part or the entirety of actual processing based on instructions of the program codes, and the functions of the above-described embodiments are realized by the processing.

As described above, in the above-described embodiments, when forming an image on a medium based on print information transferred from an electronic apparatus to an image processing apparatus, the electronic apparatus adds user information to the print information and transfers the print information to which the user information has been added, to the image processing apparatus. The image processing apparatus specifies a voice feature based on the user information received from the electronic apparatus, specifies user authentication information be executing voice authentication processing based on the specified voice feature, and starts output of the print information based on the specified user authentication information. Hence, it is possible to output print information after assuredly authenticaing a regular user, and start output of the print information according to an instruction only form the regular user.

Since it is unnecessary to transmit confidential data for authentication through a transmission channel between a computer and a printer, it is possible to construct a secure print system having less possibility of leakage of confidential data, and to assuredly start output of print information according to an instruction only from a regular user.

According to another feature of the present invention, since user authentication information is encrypted, only a regular user capable of decoding encryption can output print information, and it is possible to improve the function of privacy protection.

The individual components designated by blocks in the drawings are all well known in the image processing system, apparatus and method arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing system, comprising an electronic apparatus and an image processing apparatus, for forming an image based on print information transferred from said electronic apparatus to said image processing apparatus, said electronic apparatus comprising:

information addition means for adding a user identifier to the print information; and transfer means for transferring the print information having the user identifier added thereto to said image processing apparatus, said image processing apparatus comprising:

voice-feature specification means for specifying a voice feature based on the user identifier added to the print information by referring to a table for storing the voice feature in correspondence with the user identifier;

voice-feature extraction means for extracting a voice feature from a voice input from the user;

user-authentication means for authenticating the user by comparing the voice feature specified by said voice-feature specification means with the voice feature extracted by said voice-feature extraction means; and print-information output means for starting output of the print information if the user is authenticated by said user-authentication means.

2. An image processing system according to claim 1, wherein the table is held in a memory within said image processing apparatus.

3. An image processing system according to claim 1, wherein the table is held on an external medium connected to said image processing apparatus.

4. A storage medium storing a program constituting one of said means according to any one of claims 1–6, so as to be readable from a computer.

5. An image processing apparatus for outputting print information by receiving the print information having a user identifier added thereto transferred from an electronic apparatus, said image processing apparatus comprising:

voice-feature specification means for specifying a voice feature based on the user identifier added to the print information by referring to a table for storing the voice feature in correspondence with the user identifier;

voice-feature extraction means for extracting a voice feature from a voice input from the user;

user-authentication means for authenticating the user by comparing the voice feature specified by said voice-feature specification means with the voice feature extracted by said voice-feature extraction means; and print-information output means for starting output of the print information if the user is authenticated by said user-authentication means.

6. An image processing apparatus according to claim 4, wherein the table is held in a memory within said image processing apparatus.

7. An image processing apparatus according to claim 4, wherein the table is held on an external medium connected to said image processing apparatus.

8. An image processing apparatus according to any one of claims 4–6, wherein the voice feature stored in the table has been encrypted, and said voice-feature specification means comprises a determination means for determining the voice feature corresponding to the user identifier by decoding the encrypted voice feature.

9. An image processing method for use in a system for forming an image on a medium based on print information transferred from an electronic apparatus to an image processing apparatus, said method comprising steps performed by the electronic apparatus, comprising:

an information addition step, of adding a user identifier to the print information; and a transfer step, of transferring the print information having the user identifier added thereto to the image processing apparatus; and said method also comprising steps performed by the image processing apparatus, comprising:

a voice-feature specification step, of specifying a voice feature based on the user identifier added to the print information by referring to a table for storing the voice feature in correspondence with the user identifier;

a voice-feature extraction step, of extracting a voice feature from a voice input from the user;

a user-authentication step, of authenticating the user by comparing the voice feature specified in said voice-feature specification step with the voice feature extracted in said voice-feature extraction step; and a print-information output step, of starting output of the print information if the user is authenticated in said user-authentication step.

10. An image processing method according to claim 9, wherein the table is held in a memory within the image processing apparatus.

11. An image processing method according to claim 9, wherein the table is held on an external medium connected to said image processing apparatus.

12. A storage medium storing a program for executing one of said steps according to any one of claims 9–11, so as to be readable from a computer.

13. A program for executing one of said steps according to any one of claims 9–11.

* * * * *

UNITED STATES PATENT AND TRADEMARK OFFICE
CERTIFICATE OF CORRECTION

PATENT NO. : 6,859,794 B2
DATED : February 22, 2005
INVENTOR(S) : Takaragi

It is certified that error appears in the above-identified patent and that said Letters Patent is hereby corrected as shown below:

<u>Title page,</u>
Item [*] Notice, please delete "375" and insert -- 490 --.

Signed and Sealed this

Twenty-third Day of August, 2005

JON W. DUDAS
*Director of the United States Patent and Trademark Office*

UNITED STATES PATENT AND TRADEMARK OFFICE
CERTIFICATE OF CORRECTION

PATENT NO. : 6,859,794 B2  Page 1 of 1
APPLICATION NO. : 09/796473
DATED : February 22, 2005
INVENTOR(S) : Yoichi Takaragi It is certified that error appears in the above-identified patent and that said Letters Patent is hereby corrected as shown below:

Column 7,
Line 23, "AID" should read -- A/D --.

Column 9,
Line 21, ""claims 1-6,"" should read -- claims 1-3 and 5-7, --;
Lines 41 and 44, "claim 4," should read -- claim 5, --.

Column 10,
Line 2, "claims 4-6," should read -- claims 5-7, --.

Signed and Sealed this

Fourth Day of July, 2006

JON W. DUDAS
*Director of the United States Patent and Trademark Office*